Nov. 23, 1965 W. V. THELANDER 3,218,828
RESILIENT COUPLING
Filed Feb. 17, 1964 2 Sheets-Sheet 1
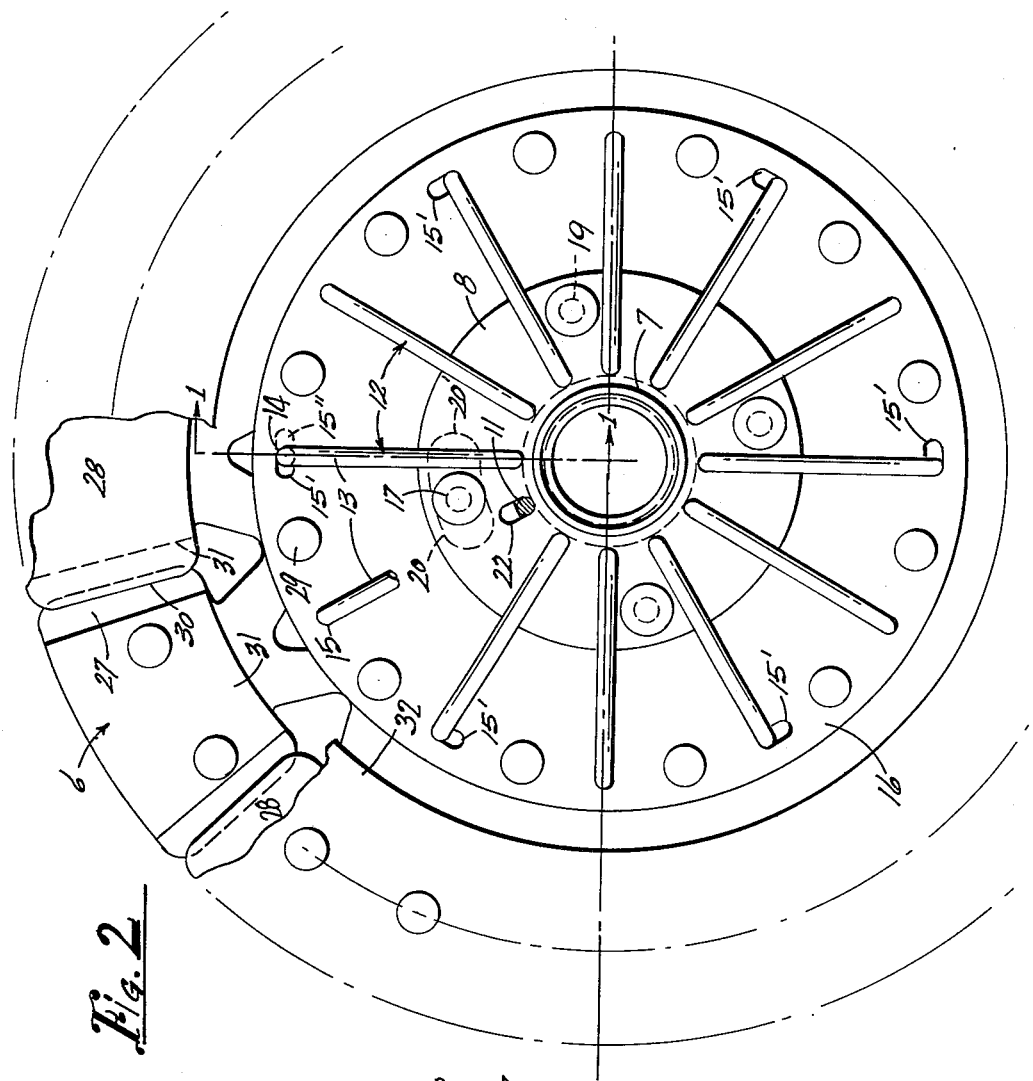
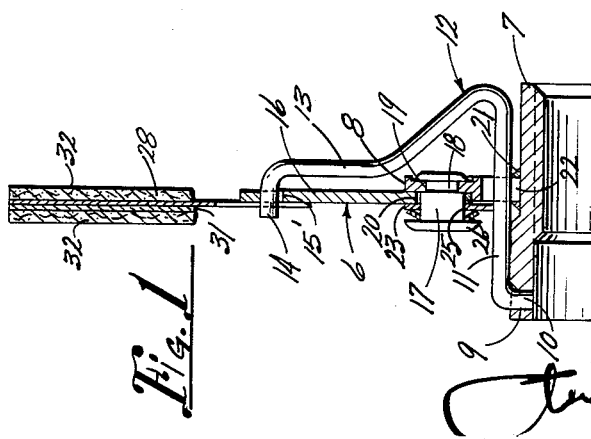
INVENTOR
W. VINCENT THELANDER
ATTORNEY Nov. 23, 1965     W. V. THELANDER     3,218,828
RESILIENT COUPLING
Filed Feb. 17, 1964     2 Sheets-Sheet 2
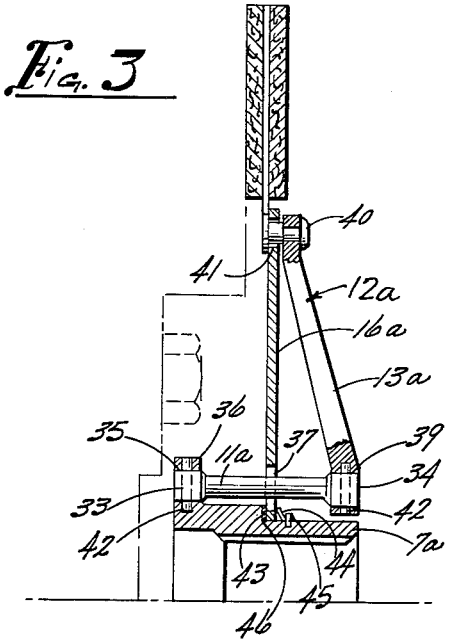
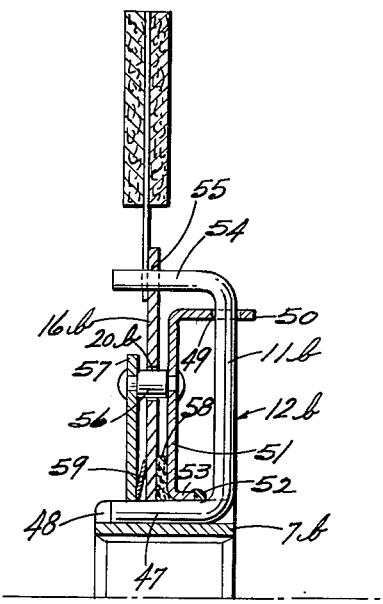
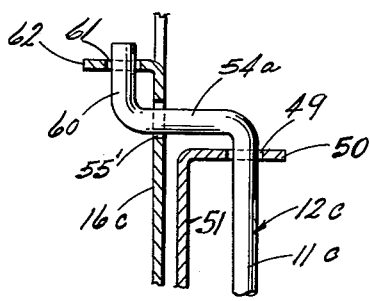
INVENTOR
W. VINCENT THELANDER
ATTORNEY

United States Patent Office 3,218,828
Patented Nov. 23, 1965

3,218,828
RESILIENT COUPLING
W. Vincent Thelander, %  Sugar Loaf Mountain Ranch,
Box 385, Cave Creek, Ariz.
Filed Feb. 17, 1964, Ser. No. 345,525
25 Claims. (Cl. 64—27)

This invention relates to friction clutch plates or disks, and is more particularly concerned with improvements in the hub construction to incorporate damper means to meet the new requirements of the higher speed engines used in modern cars for which the old coiled compression spring type of dampers are completely inadequate, as is readily seen from the fact that in the earlier era the engines employed were run at speeds below 5000 r.p.m., and the torque was seldom over 275 foot-pounds, whereas engine speeds now are up to 7200 r.p.m. and develop torques up to 450 foot-pounds.

It is therefore the principal object of my invention to provide torsion spring dampers interconnecting the hub and plate in a thoroughly practical manner, meeting the requirements for quantity production at low cost and still afford adequate damping action for at least the life of the clutch disk, certain of the forms herein disclosed combining highly desirable flexing action of the spring means with the torsion spring effect, and other forms utilizing low cost stamped levers oscillatable with the plate and driving the hub through the torsion bars or springs mounted on the hub.

The invention is illustrated in the accompanying drawings, wherein—

FIG. 1 is a section on the line 1—1 of FIG. 2, showing generally L-shaped wire torsion springs in which the horizontal bottom portion of the L that is anchored at one end to the hub forms the torsion bar for one spring rate in the damping action while the vertical leg disposed radially with respect to the plate is anchored thereto at the outer end to flex and thus give an additional spring rate in the damping action;

FIG. 2 is a face view of the plate, showing twelve torsion springs in equally spaced relation circumferentially of the plate, although any number may be used depending on the torque, this view also illustrating the elongation circumferentially of the openings in the plate where the outer ends of alternate springs are connected thereto, and also the elongation circumferentially of the openings in the plate where the plate is connected with the flange on the hub, as well as the elongation radially of the openings in the flange through which the torsion bar ends of the springs extend, permitting entry therethrough of the right angle bent end portions of the torsion bar portions of the damper springs in assembling the clutch plate;

FIG. 3 is a view similar to FIG. 1, showing a modified or alternative form in which a straight torsion bar mounted on the hub and connected thereto at one end is subjected to a twisting action by connection at its other end with one end of a stamped sheet metal operating lever connected at its other end with the plate;

FIG. 4 is still another view similar to FIG. 1, showing a U-shaped wire spring, the two parallel arms of which are horizontally disposed, one rigidly connected to the hub and the other slidably connected with the plate, the cross portion being disposed radially with respect to the plate; and FIG. 5 is still another modification related to FIG. 4.

Similar reference numerals are applied to corresponding parts throughout these views.

Referring first to FIGS. 1 and 2, the reference numeral 6 designates my improved friction clutch plate generally, the same comprising relatively rotatable inner and outer portions, the inner portion being formed by a center hub 7 that is splined for driving connection with the driving shaft of an automotive transmission and provided with an annular flange 8. The hub has radial holes 9 provided in one end thereof in equally circumferentially spaced relation wherein to anchor the right angle bent end portion 10 of the horizontal bottom portions 11 of a plurality of L-shaped wire springs 12 that are provided for dampers, the horizontal portions 11 of these L-shaped springs serving as torsion bars while the radially disposed portions 13, which have right angle bent outer end portions 14 entered in holes 15 provided in equally circumferentially spaced relation in the plate 16 so as to oscillate with the plate in the turning thereof relative to the hub 7, serve to twist the torsion bar portions 11 and accordingly provide the desired damping action required for the higher speed, higher torque engines presently in use in modern cars, the horizontal bar portions 11 in their torsional stress having one spring rate for the damping action, and the radial arm portions 13 in their lateral flexing giving an additional spring rate for the damping action. Obviously, the radially disposed legs 13 of the L-shaped springs 12 will not only oscillate with the plate 16 but will be flexed to an appreciable extent to augment the damping action to advantage. The horizontal torsion bar portions 11 are located as close as possible to the axis of the plate and parallel to it, while the torsional loading of the bars is achieved by the radial arm portions 13, which, for best efficiency in assuming the driving torque of the engine, are connected to the plate at maximum radius, the radius being much larger than the coiled springs in slots type of damper used heretofore. Thus, the present torsion spring dampers can be and are of the simplest spring form—the L-shaped wire springs 12, in which the horizontal portion 11 of straight bar form is subject to twisting and exerts only torsional stress for one spring rate in damping, while the radial arm or leg 13, which is subject to flexing in applying the load to the bar 11, has a second spring rate. These torsion spring dampers 12 operate in a substantially friction-free manner and, by virtue of the fact that they operate on such a large radius in relation to what were provided heretofore, they can be provided of smaller dimensions and lighter weight than would otherwise be necessary. A plurality of shouldered rivets 17 provided in equally circumferentially spaced relation have their reduced end portions 18 entered in circular holes 19 in the flange 8 on the hub, and these rivets fasten the plate 16 to the flange 8 with freedom for a predetermined amount of relative rotation by virtue of the elongation circumferentially of slots 20 provided in the plate 16 through which these rivets extend, one end 20′ of these slots serving as a positive stop to limit the relative rotation and accordingly avoid excessive loading of the damping springs 12. The flange 8 is welded to the hub 7, as indicated at 21, and has circumferentially spaced radial slots 22 provided therein through which the torsion bar end portions 11 of the damper springs 12 extend, the elongation of the slots 22 being sufficient to permit easy entry therethrough of the right angle bent end portions 10 of the bar portions 11 and, incidentally, also allow for a certain amount of flexing of the torsion bar portions 11 of springs 12 radially with respect to the flange 8 at the limit of loading of springs 12, such flexing radially relative to the flange 8 being, however, limited to that half of the torsion bar portions 11 remote from the right angle bent end portions 10, there being a ring 23 encircling the torsion bars 11 to confine the same against radial displacement with respect to the hub 7 at their mid portions, as clearly shown in FIG. 1, this ring 23 having holes 25 in circumferentially spaced relation closely receiving the rivets 17, and there being spring washers 26 compressed between the ring 23 and the heads of the rivets 17 to retain the plate 16 in contact with flange 8 under resilient pressure and obtain friction lag.

The plate 16 may have any suitable "mush" construction, the one shown being like that disclosed in my Patent No. 2,812,842 and comprising two series of stamped spring steel cushion sections or segments 27 and 28 riveted to the outer periphery of the plate, as indicated at 29, the segments of both series being circumferentially spaced and the segments 27 of one series being in staggered relation to the segments 28 of the other series, and the two series having lateral edges in overlapped relation, as indicated at 30. Segmental shaped stamped sheet metal shims or spacers 31 are secured to the outer faces of the main body portions of the segments 27 and 28, and there are friction facing rings or pads 32 engaging the outer faces of the shims or spacers 31 and suitably bonded thereto.

In operation, drive is transmitted to the plate 16 from the flywheel of the engine in the usual way, and springs 12 have their legs 13 flexed in a counter-clockwise direction, as viewed in FIG. 2, thereby subjecting the torsion bar portions 11 of the spring 12 to a twist in a counterclockwise direction, whereby to secure the desired damping action in transmitting the drive from the plate 16 to the hub 7 and thence to the driving shaft of the transmission. The holes 15' in plate 16 for alternate springs 13 are shown as elongated circumferentially of the plate in a counterclockwise direction to provide delayed action in these alternate springs in coasting, the intermediate springs anchored in holes 15 responding instantly upon coasting. In that way, the drive take-up is smoother. While I have shown elongation in a counterclockwise direction on the "coast" side, it should be understood that the elongation could be provided on the opposite side, as indicated in dotted lines at 15" in FIG. 2 on the "drive" side, the elongation in either direction being as required to change the effective spring action on the "drive" and "coast" side. The elongation circumferentially of slots 20 is on both the drive and coast sides, with a greater amount of clearance on the drive side as I have found that works most satisfactorily, the end 21 on the drive side serving as a positive stop to limit flexing of springs 12. At the limit of flexing, springs 12 will have their torsion bar portions 11 flexed slightly radially with respect to hub 7 in slots 22, such flexing being, however, only in that half portion of torsion bars 11 from which arms 13 extend.

In FIG. 3 I have shown a modification 12a in which a separate torsion bar 11a and a separate stamped sheet metal lever 13a are employed, the torsion bar 11a being cylindrical but having squared or splined end portions 33 and 34, the end portions 33 of the bars being received with a close fit in square holes 35 provided in circumferentially spaced relation in the annular flange 36 provided on one end of the hub 7a, the bars extending freely through holes 37 provided in circumferentially spaced relation in the plate 16a and each of the bars 11a having its other end 34 received with a close fit in a square hole 39 provided in one end of the associated lever 13a, the other end of the lever being secured to the plate by means of a stepped rivet 40 in radial slot 41 provided in the plate. Pins 42 permanently secure the bars 11a in assembled relationship to the hub 7a and levers 13a. The plate 16a is pressed resiliently against an annular shoulder 43 on the hub 7a by means of a spring washed 44 secured in place on the hub by a split snap ring 45 entered in a groove in the hub. A nylon washer 46 is disposed between the shoulder 43 and the plate to reduce wear and insure quiet operation. It is obvious that with this construction the operation will be closely similar to that of the construction shown in FIGS. 1 and 2 except that the separate levers 13a can be provided of any desired flexibility in relation to the torsion characteristics of the separate bars 11a, although here the levers 13a, especially if provided of ample width and thickness, are not apt to flex laterally to any appreciable extent, and hence substantially the entire damping action is provided by the torsion bars 11a. Here again, the holes 37 and slots 41 allow for the relative rotation between the plate and hub and serve to limit such relative movement to a predetermined extent.

FIG. 4 shows another form of wire damping springs 12b which are generally U-shaped with the cross-portion 11b of the U disposed radially with respect to the plate 16b and serving as the torsion bar portion, one arm 47 of the U being rigidly secured in a longitudinal groove 48 in the hub 7b after the series of damper springs 12b have been assembled in circumferentially spaced holes 49 provided in the outer flange 50 of a channel-shaped sheet metal ring 51 welded, as indicated at 52, by means of its inner flange 53 to the hub 7b, whereby to provide adequate support for the torsion bars 11b, which depend for their loading on the flexing of the other arm 54 of the U by virtue of its entry freely through a short slot 55 provided in the plate 16b. It is understood, of course, that the slots 55 are provided in circumferentially spaced relation in the plate 16b, one for each arm 54 of a damper spring 12b. A plurality of circumferentially spaced rivets 56 serve to secure a sheet metal ring 57 to the previously mentioned ring 51 in spaced relation thereto with the plate 16b therebetween, a ring of brake lining material 58 being disposed on one side of the plate and a compressible spring washer 59 being disposed on the other side and compressed to hold the plate 16b under resilient pressure in contact with ring 58, while the rivets 56, which extend through circumferentially elongated slots 20b provided in the plate 16b in circumferentially spaced relation, serve to transmit drive positively to the hub 7b at the limit of flexing of arms 54. The operation of this construction is comparable to that shown in FIGS. 1 and 2 from the standpoint that there will, of course, be a certain amount of flexing of arms 54 to add that spring rate to the spring rate of the torsion bar portions 11b.

In FIG. 5, which construction is closely related to that of FIG. 4, everything radialy inwardly from the portion shown in FIG. 5 being duplicative of what is shown in FIG. 4, the arms 54a are the same as the arms 54 but have right angle bent portions 60 received in slots 61 provided in lugs 62 struck from the plate 16c at circumferentially spaced points, so that there is one lug 62 for each damper spring 12c. The openings 55' provided in the plate 16c through which arms 54a extend are enlarged sufficiently to permit freedom of lateral swinging of the arms in the relative rotation of the plate 16c. Here the lateral flexing of the right angle bent end portions 60 of arms 54a, added to the flexing laterally of the arms 54a, gives an additional spring rate beyond what is obtainable with the construction of FIG. 4, because, obviously, the arms 54a are subjected to a twisting action in the oscillation of the right angle bent end portions 60, and thus the arms 54a become supplementary torsion bars in relation to the torsion bars 11c.

It is believed the foregoing description conveys a good understanding of the objects and advantages of my invention. The appended calims have been drawn to cover all legimate modifications and adaptations.

I claim:

1. In a clutch plate comprising a center hub, and a plate oscillatably mounted on the hub, the combination of resilient drive transmitting means comprising an elongated substantially straight twistable and resilient torsion bar disposed substantially parallel to the axis of rotation of said hub, and means connecting the opposite ends of said bar with the hub and plate including a flexible lever extending substantially radially relative to the plate and hub and connected at its inner end to one end of said bar and connected to the plate at its outer end so as to subject said bar to a twisting action within its elastic limit and thereby transmit drive resiliently between said hub and plate.

2. A clutch plate as set forth in claim 1 including means positively limiting oscillation of said plate relative to said hub to prevent excessive twisting of said torsion bar.

3. In a clutch plate comprising a center hub, and a plate oscilatably mounted on the hub, the combination of resilient drive transmitting means comprising a plurality of parallel elongated substantially straight twistable and resilient torsion bars disposed in equally circumferentially spaced relation around said hub in parallel relation to its axis of rotation, means rigidly connecting one end of said bars with the hub, and levers disposed substantially radially relative to said plate and hub and rigidly connected at their one end with the other end of said bars and pivotally connected at their other end with said plate so as to subject said bars to a twisting action within their elastic limit and thereby transmit drive resiliently between said hub and plate.

4. A clutch plate as set forth in claim 3 including means positively limiting oscillation of the plate with respect to the hub, whereby to prevent excessive twisting of said torsion bars.

5. A clutch plate as set forth in claim 3 wherein said levers are integral with said bars, said bars being bent to define said levers in transverse relationship to one end of said bars.

6. A clutch plate as set forth in claim 3 wherein said levers are integral with said bars, said bars being bent to define said levers in transverse relationship to one end of said bars, the connections at the remote ends of said bars and levers with the hub and plate respectively being provided by bent end portions on said bars and levers engaged in holes provided in said hub and plate, respectively.

7. A clutch plate as set forth in claim 3 wherein said levers are integral with said bars, said bars being bent to define said levers in transverse relationship to one end of said bars, the clutch plate including means engaging the torsion bars intermediate their ends to hold the same against lateral displacement and radial displacement with respect to said hub while the connections at one end of the torsion bars with the hub prevent endwise displacement of said bars relative to said hub.

8. A clutch plate as set forth in claim 3 wherein said levers are integral with said bars, said bars being bent to define said levers in transverse relationship to one end of said bars, the connections at the remote ends of said bars and levers with the hub and plate respectively being provided by bent end portions on said bars and levers engaged in holes provided in said hub and plate, respectively, the holes in said plate receiving the bent outer ends of certain of said levers being elongated circumferentially of said plate on the drive side.

9. A clutch plate as set forth in claim 3 wherein said levers are integral with said bars, said bars being bent to define said levers in transverse relationship to one end of said bars, the connections at the remote ends of said bars and levers with the hub and plate respectively being provided by bent end portions on said bars and levers engaged in holes provided in said hub and plate, respectively, the holes in said plate receiving the bent outer ends of certain of said levers being elongated circumferentially of said plate on the coast side.

10. A clutch plate as set forth in claim 3 wherein said levers are integral with said bars, said bars being bent to define said levers in transverse relationship to one end of said bars, the connections at the remote ends of said bars and levers with the hub and plate respectively being provided by bent end portions on said bars and levers engaged in holes provided in said hub and plate, respectively, the holes in said plate receiving the bent outer ends of certain of said levers being elongated circumferentially of said plate on the drive and coast sides.

11. In a clutch plate comprising a center hub, and a plate oscillatably mounted on the hub, the combination of resilient drive transmitting means comprising a plurality of elongated substantially straight twistable and resilient torsion bars mounted in radial relationship to said hub and plate in equally circumferentially spaced relationship to one another, each bar having arms bent in right angle relation to the inner and outer end portions thereof and integral therewith and substantially parallel to one another, the inner arms being mounted on said hub in equally circumferentially spaced parallel relationship to one another so as to permit application of a twisting moment on each bar by means of its outer arm, the outer arms being slidably pivotally connected with said plate so as to subject said bars to a twisting action within their elastic limit and transmit drive resiliently between said hub and plate.

12. A clutch plate as set forth in claim 11 including means for positively limiting the oscillatory movement of said plate with respect to said hub to prevent excessive twisting of said bars.

13. A clutch plate as set forth in claim 11 wherein the outer arms have right angle bent extremities normally disposed radially with respect to said plate and hub, the lateral flexing of which in applying a twisting moment through said outer arms to said bars adds a further spring rate.

14. In a clutch plate comprising a center hub, an annular support fixed on said hub including two axially spaced members, a clutch plate oscillatably mounted therebetween and projecting radially beyond said support, and a plurality of elongated substantially straight twistable and resilient torsion bars mounted on said support in radial relationship to said hub and plate in equally circumferentially spaced relationship to one another, means rigidly connecting the radially inner ends of said bars with said support and hub, and levers disposed substantially parallel with the hub axis and rigidly connected at one end with the radially outer ends of said bars and pivotally connected at the other end with said plate so as to subject said bars to a twisting action within their elastic limit and transmit drive resiliently between said hub and plate.

15. A clutch plate as set forth in claim 14 including means for positively limiting the oscillatory movement of said plate with respect to said support to prevent excessive twisting of said bars.

16. A clutch plate as set forth in claim 14 wherein the levers have right angle bent extremities normally disposed radially with respect to said plate and hub, the lateral flexing of which in applying a twisting moment through said levers to said bars adds a further spring rate.

17. In a clutch plate comprising a center hub, and a plate oscillatably mounted on the hub, the combination of resilient drive transmitting means comprising a plurality of elongated substantially straight twistable and resilient torsion bars mounted in radial relationship to said hub and plate in equally circumferentially spaced relationship to one another, means rigidly connecting the radially inner ends of said bars with the hub, and levers disposed substantially parallel with the hub axis and rigidly connected at one end with the radially outer ends of said bars and pivotally connected at the other end with said plate so as to subject said bars to a twisting action within their elastic limit and transmit drive resiliently between said hub and plate.

18. A clutch plate as set forth in claim 17 including means for positively limiting the oscillatory movement of said plate with respect to said hub to prevent excessive twisting of said bars.

19. A clutch plate as set forth in claim 17 wherein the connections of said levers with said plate are provided by secondary levers in transverse relation to and rigid with the outer ends of the first mentioned levers and normally disposed substantially radially with respect to said plate and providing the pivotal connection on their radially outer ends with said plate, the lateral flexing of said secondary levers in applying a twisting moment through the first mentioned levers to said bars adding a further spring rate.

20. A clutch plate as set forth in claim 19 including means for positively limiting the oscillatory movement of said plate with respect to said hub to prevent excessive twisting of said bars.

21. In a clutch plate comprising a center hub, and a plate oscillatably mounted on the hub, the combination of resilient drive transmitting means comprising a plurality of parallel elongated substantially straight twistable and resilient torsion bars disposed in equally circumferentially spaced relation around said hub in parallel relation to its axis of rotation, means rigidly connecting one end of said bars with the hub, said bars being all alike and of a predetermined cross-section and length for a predetermined spring rate in the torsional stress thereof for damping purposes, and separate levers disposed susbtantially radially relative to said plate and hub and rigidly connected at their inner end with the other end of said bars and pivotally connected at their outer end with said plate so as to subject said bars to torsional stress and thereby transmit drive resiliently between said hub and plate, said levers being of a different predetermined cross-section and of a suitable length in relation to said bar cross-section and length so as to have a predetermined flexibility and provide another spring rate in the lateral flexing thereof in torsionally loading said bars for damping purposes.

22. A clutch plate as set forth in claim 21 including means positively limiting oscillation of the plate with respect to the hub, whereby to prevent excessive twisting of said torsion bars.

23. A clutch plate as set forth in claim 21 wherein the plate has holes provided therein for pivotal connection of the outer ends of said levers with said plate, the holes in said plate for pivotal connection of certain of said levers being elongated circumferentially of said plate on the drive side.

24. A clutch plate as set forth in claim 21 wherein the plate has holes provided therein for pivotal connection of the outer ends of said levers with said plate, the holes in said plate for pivotal connection of certain of said levers being elongated circumferentially of said plate on the drive and coast side.

25. A clutch plate as set forth in claim 21 wherein the plate has holes provided therein for pivotal connection of the outer ends of said levers with said plate, the holes in said plate for pivotal connection of certain of said levers being elongated circumferentially of said plate on the drive and coast side.

References Cited by the Examiner
UNITED STATES PATENTS

| | | |
|---|---|---|
| 1,991,436 | 2/1919 | Wemp. |
| 1,640,670 | 8/1927 | Schaeffer. |
| 2,114,247 | 4/1938 | Davis. |
| 2,234,443 | 3/1941 | Macbeth. |
| 2,694,319 | 11/1954 | Johnson. |

DAVID J. WILLIAMOWSKY, *Primary Examiner.*